MEMORY FABRICATION METHOD

Original Filed Sept. 10, 1962

INVENTORS
BERNARD J. OLSON
ROBERT J. TEPLY
BY [signature]
ATTORNEY 3,392,053
Patented July 9, 1968

3,392,053

MEMORY FABRICATION METHOD

Bernard J. Olson and Robert J. Teply, Minneapolis, Minn., assignors to Sperry Rand Corporation, New York, N.Y., a corporation of Delaware Original application Sept. 10, 1962, Ser. No. 222,441. Divided and this application June 15, 1966, Ser. No. 557,874
2 Claims. (Cl. 117—212)

ABSTRACT OF THE DISCLOSURE

A method of fabricating thin-ferromagnetic-film memory elements involving forming a substrate member by depositing a conductive layer on the surface of a polished glass body, separating the layer from the glass body and then depositing the thin-ferromagnetic-film elements on the so-formed layer's replicated surface.

The invention herein described was made in the course of or under a contract or subcontract thereunder, with the Department of the Navy, and is a divisional application of parent application Ser. No. 222,441, filed Sept. 10, 1962 and now abandoned.

In the preparation of thin magnetic films, particularly ferromagnetic nickel-iron films which are intended to be utilized as binary information storage elements in data processing equipment, the individual films are normally deposited in an array pattern, the individual array including generally a plurality of word lines and a plurality of bit lines. In order to achieve uniformity of operation along with minimum dissipation of energy, it is essential that each of the individual arrays exhibit a high degree of uniformity, one to another. In order to achieve control of the magnetic condition of a film in any given time, and in order to accomplish this with a minimum dissipation of energy, it is generally essential that the drive current loop be disposed as closely as possible to the film being controlled. This is desirable in order to improve the coupling of the flux to the film. In this fashion it is also possible to achieve a greater magnitude of output for given drive fields. In order to achieve these objectives, a relatively thin electrically conductive metallic substrate layer is indicated. However, in attempting to utilize a metallic substrate layer, difficulties are encountered in that the crystalline nature of metallic material, such as copper or the like, either severely encumber or prevent the preparation of surfaces which have the required degree of smoothness. In addition, problems are encountered in preparing flat, uniformly planar surfaces on a metallic substrate layer, such as copper or the like, due to the speed at which an oxide layer forms on the substrate. Because of these disadvantages, it becomes difficult to prepare reasonable magnetic thin films on a surface of conventionally prepared and polished metallic substrate surfaces. The alternative is, therefore, to use a substantially amorphous or super-cooled liquid surface such as is found on ordinary glass members or the like. The mechanical nature of these amorphous materials such as glass, for example, is generally such that a substantial transverse thickness is required for handling and the like. It has been found that the mass of the substrate material, including the transverse thickness, interferes with the flux coupling of the films to the drive currents, sense lines, and the like. The active ferromagnetic film elements are therefore necessarily disposed at a point which is too remote from the transmission lines, including the drive lines, sense lines and the like, to provide for optimum operation.

In accordance with the present invention, the combined advantages of having a surface with the uniformity of a glass or amorphous substrate surface, the advantage of having the magnetic film disposed closely adjacent the substrate, together with the advantage of having a metallic electrically conductive substrate surface are all achieved. The technique of the present invention includes the preparation of a metallic substrate member along and in contact with the surface of a glass body, the specific surface of the substrate to be ultimately utilized in contact with the ferromagnetic film being the glass replicated surface of a metallic member which has been initially prepared in intimate contact with the surface of an amorphous or glass body.

Briefly, according to the present invention, a metallic substrate member with an oxide resistant surface such as a film of nickel is deposited and prepared along the surface of a highly polished glass body, the oxide resistant surface being in intimate contact with the glass surface. The preparation of the substrate layer is such that the metallic layer is bonded to the polished glass surface during preparation, and the uniform smooth surface of the glass substrate is accordingly replicated along the mating surface of the metallic substrate layer. When a sufficiently thick substrate layer has been prepared over the initially deposited film, the layer is removed from the glass and the glass replicated oxide resistant metallic surface is then prepared for deposition of a ferromagnetic film thereon. A ferromagnetic material such as Permalloy having a composition ranging from between about 79% and 82% of nickel, balance iron is then either electrolytically or evaporatively deposited onto the substrate along oxide resistant glass replicated surface thereof. Other ferromagnetic materials may be utilized, if desired, such as appropriately selected elements from the magnetic group including iron, nickel, and cobalt. Accordingly, the surface characteristics of the substrate include substantially all the advantageous features of a polished glass surface, these advantages being obtained without the attending disadvantages of a relatively bulky glass or non-metallic substrate member. In addition, the advantages of a relatively thin metallic substrate layer are likewise achieved.

It is therefore an object of the present invention to prepare improved ferromagnetic films utilizing a metallic substrate having an oxide resistant glass replicated surface for deposition of ferromagnetic films thereon.

It is further an object of the present invention to provide an improved technique for preparing metallic substrates for use in connection with ferromagnetic films, the metallic substrate being electrically conductive and having an oxide resistant glass replicated contacting surface.

It is yet a further object of the present invention to provide an improved technique for preparing metallic substrate members having non-ferromagnetic characteristics, the substrate being prepared through the initial deposition of a film of metallic material such as nickel or the like on the surface of a highly polished glass surface, this being followed by the building up of a heavier layer to form a substrate body, the substrate then being peeled from the glass with the glass replicated surface ultimately being utilized as a surface for receiving an electrolytic or evaporative deposition of a ferromagnetic film thereon.

Other and further objects of the present invention will become apparent to those skilled in the art upon a study of the following specification, appended claims, and accompanying drawings, wherein:

Figure 3:
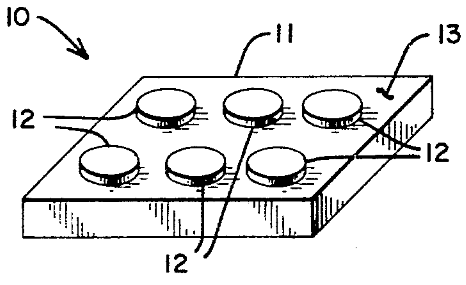
FIG. 3 is a perspective view of a completed ferromagnetic film array, a plurality of films being deposited upon a substrate surface, the various drive lines, sense lines, and the like being removed; and, FIG. 4 is a perspective view, partially on section, showing the typical relationship of various electrical transmission lines to the individual films.
Figure 4:
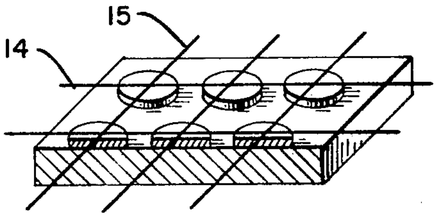

In the preferred modification of the present invention, attention is directed to FIG. 3 wherein there is illustrated a magnetic film memory array generally designated 10 which includes a substrate member 11 and a plurality of individual ferromagnetic film memory elements 12 disposed along the surface 13 of the substrate member 11. The individual ferromagnetic memory elements are prepared in accordance with techniques well known and established in the art such as, for example, by means of evaporative deposition techniques. A particular evaporative deposition technique which may be utilized is disclosed in the patent to S. M. Rubens, No. 2,900,282, dated Aug. 18, 1959; this particular technique being preferred for use in connection with the present invention. In order to ultimately control, modify, and utilize any existing remanent magnetic state of the individual films or film members 12, and in order to modify, control, or determine the existing state of this remanent magnetization vector in certain individual elements 12 of the array, a pair of conductors, such as the transmission lines 14 and 15 are utilized. Upon passage of current therealong, these conductors generate a magnetic flux which is inductively linked to certain of the individual ferromagnetic core members 12. Conductors of this type and arrangements thereof are well known in the art and, accordingly, do not establish any portion of the present invention, other than that they are necessary in the ultimate operation and utilization of the individual ferromagnetic cores in the various film arrays.

Figure 1:
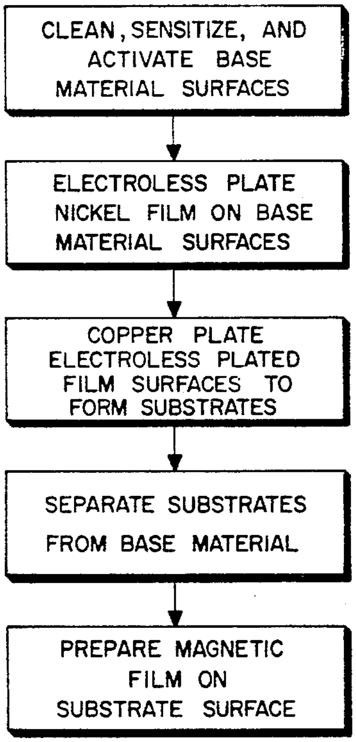
FIG. 1 is a flow chart illustrating particular steps which are carried out in practicing the improved ferromagnetic film preparation technique of the present invention.
Figure 2:
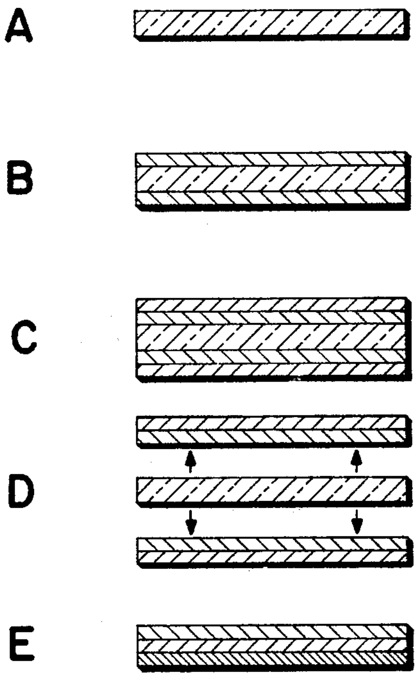
FIG. 2 is a sectional view illustrating the relationship of the substrate material to the glass surface during the various steps of the preparation technique shown in FIG. 1.

Particular attention is now directed to FIGS. 1 and 2 wherein the preferred technique is illustrated for the preparation of ferromagnetic core elements along the surface of substrates which have been prepared in accordance with the improved technique of the present invention. The substrate is prepared as an adhering layer, film, or the like upon the surface of a highly polished glass member, the finished substrate then being removed from the glass member and the oxidation resistant glass replicated metallic surface thereof ultimately being utilized for receiving the ferromagnetic cores.

In preparing the surface of the glass body for receiving the substrate layer, the surface is initially carefully cleaned. In this regard, a paste prepared from a grit consisting essentially of precipitated calcium carbonate powder has been found to be particularly desirable. The cleaned surface is then treated with an electroless nickel plating solution to form a thin metallic nickel layer which renders it possible to perform a succeeding electrolytic deposition of a metal such as copper or the like upon the treated surface of the glass body. Other oxide resistant layers such as silver, palladium, and gold may be utilized in lieu of the nickel. Various application techniques may also be used, such as flash coating or the like. Subsequent to the initial metalizing operation, the process includes a second metallic deposition step which includes preparing a backing layer such as an electrolytic copper layer on the metallized surface. Copper is the preferred material in this regard. The electrolytic deposition of copper is continued until a film having a thickness of about 10 mils is achieved. For purposes of mechanical rigidity due to the required handling and other treatments of the substrates, a layer having a thickness of in excess of about 5 mils is normally required; however, it is generally more desirable to have a film thickness of about 10 mils. This substrate layer after preparation is peeled from the surface of the glass and then is prepared for receiving the ferromagnetic film elements thereon. When nickel forms the surface of the substrate, protection from oxidation is achieved. When either electrolytic or evaporative techniques are utilized to prepare the individual ferromagnetic films, suitable masking may be disposed over the appropriate surface area portions of the surface 13 of the substrate 11. After deposition of the appropriate ferromagnetic films, which may, for example, consist essentially of an alloy of nickel and iron, such as 81% nickel, balance iron, appropriate transmission lines are applied in inductive linking relationship to the individual films 12. A protective coating may then be applied to the system, if desired.

Example 1

In preparing a ferromagnetic film array in accordance with the present invention, a smooth glass surface was cleaned utilizing a slurry of calcium carbonate and water, the slurry being in the form of a heavy paste grit. The outer surfaces of the glass plate were then sandblasted to a mild texture in order to enhance adhesion and retard peeling along these outer areas. The glass surface was then washed in a chromic acid solution, rinsed, and sensitized with a solution as follows:

Sensitizer:

| | |
|---|---|
| $SnCl_2 \cdot 2H_2O$ (stannous chloride) ______gm./l__ | 70 |
| HCl (conc. hydrochloric acid) ________cc./l__ | 40 |
| Temperature ____________________________ | Room |
| Time ______________________________minutes__ | 4 |

a predetermined area of the glass including the textured areas being exposed to this solution.

An activator solution was then applied to the surface, the solution having the composition:

| | |
|---|---|
| $PdCl_2 \cdot 2H_2O$ (palladium chloride) ________gm./l__ | 0.1 |
| HCl (conc. hydrochloric acid) ___________cc./l__ | 1 |
| Temperature ___________________________° F__ | 110 |
| Time ________________________________minutes__ | 4 |
| pH _____________________________________ | 3.5–4.5 |

An electroless nickel plating solution was then applied to the surface, the solution having the composition:

| | |
|---|---|
| $NiSO_4 \cdot 6H_2O$ (copper sulfate) __________gm./l__ | 35 |
| $Na_3C_6H_5O_7 \cdot 2H_2O$ (sodium citrate) ______gm./l__ | 11.5 |
| $NaC_2H_3O_2 \cdot 3H_2O$ (sodium acetate) ______gm./l__ | 33 |
| $NaH_2PO_2 \cdot H_2O$ (sodium hypophosphite) __gm./l__ | 15 |
| $MgSO_4 \cdot 7H_2O$ (magnesium sulfate) ______gm./l__ | 41 |
| pH ___________________________________ | 3.5–4.5 |
| Temperature _________________________° F__ | 180–185 |
| Time, sufficient to obtain uniform conductive plate (approx. 20 sec.). | |

The plated glass surface was then washed, leads were applied to the metallized layer, and the body treated in an electrolytic bath having the composition:

| | |
|---|---|
| $CuSO_4 \cdot 5H_2O$ (copper sulfate) __________oz./gal__ | 33 |
| $H_2SO_4$ (conc. sulfuric acid) ____________oz./gal__ | 12 |
| Molasses ___________________________oz./gal__ | 0.1 |
| Temperature _____________________________ | Room |
| Current density __________________________a.s.f__ | 30 |

Plating is continued for a period of time until a 10 mil layer of copper was plated onto the base. The assembly was then removed from the copper plating bath, washed and permitted to dry. The layer forming the substrate was then stripped from the polished glass surface area, the specific surface which had been in contact with and bonded to the glass surface being utilized as the surface for receiving the ferromagnetic memory cores. Care must be taken to prevent formation of an oxide layer on the surface to receive the ferromagnetic films. The substrate member was then placed in a second evaporative coating chamber and an array of individual ferromagnetic cores having a composition of 81% of nickel, balance iron was evaporatively coated onto the substrate surface. After completing this operation, which was carried out in accordance with the techniques set forth in the aforementioned patent to S. M.

Rubens, the system was then ready for application of transmission lines, in accordance with the specific manner indicated by the ultimate end use of the product. Films prepared in accordance with this example have rectangular loops, the magnetization angle lies close to the easy axis, the coercive force $H_c$ is between about 2 and 3, and the ratio of $H_c/H_k$ is between 0.5 and 1.0.

Example 2

A substrate was prepared in accordance with the technique set forth in Example 1. Thereafter, a thin-film alloy was plated onto the substrate in accordance with the following bath and operation conditions:

| | | |
|---|---|---|
| $NiSO_4 \cdot 6H_2O$ (nickel sulfate) | gm./l. | 180 |
| $FeSO_4 \cdot 7H_2O$ (ferrous sulfate) | gm./l. | 8 |
| $H_3BO_3$ (boric acid) | gm./l. | 25 |
| $C_6H_4SO_2NHCO$ (saccharine) | gm./l. | 0.8 |

Temperature—° F. 80–90
Time—seconds 102
Plated in a 40 (approx.) oersted field.

Films prepared in accordance with this example have rectangular loops, a typical angle of magnetization along the easy axis of ±4°, a typical coercive force $H_c$ of about 2.5, and a typical ratio of $H_c/H_k$ of about 0.5.

For purposes of uniformity in preparation of individual film arrays, it may be generally desirable that the identical surface area of the glass be employed for receiving succeeding metallic substrates in a manner similar to the plating techniques set forth above. Accordingly, the glass unit or element is prepared for reuse in succeeding plating operations in accordance with the above examples.

It will be appreciated that the specific examples given herein are for purposes of illustration only and are not to be otherwise construed as a limitation upon the scope to which this invention is otherwise reasonably entitled.

What is claimed is:

1. A method for fabricating film memory elements comprising the steps of:
   (a) forming an electrically conductive substrate member by first depositing a layer of metal from the group consisting of nickel, silver, paladium, and gold upon a surface of a polished glass body;
   (b) secondly depositing a backing layer of copper onto the first formed layer, said first and second layers forming the substrate member;
   (c) separating the substrate member from the polished glass body to expose a replicated intersurface of the substrate member;
   (d) and depositing ferromagnetic material on predetermined areas of the replicated intersurface surface to form at least one memory element thereon.

2. A method for fabricating film memory elements comprising the steps of:
   (a) forming an electrically conductive substrate in bonded relationship upon a smooth planar surface of an amorphous body by depositing a first layer of oxide resistant metal and depositing a second backing layer of copper upon said first layer;
   (b) separating the substrate from the amorphous body to expose a replicated intersurface area of the substrate;
   (c) and depositing ferromagnetic material on predetermined areas of the replicated intersurface to form memory elements thereon.

References Cited

UNITED STATES PATENTS

| | | | |
|---|---|---|---|
| 3,098,803 | 7/1963 | Godycki et al. | 204—38 |
| 3,102,048 | 8/1963 | Gran et al. | 117—61 |
| 3,257,629 | 6/1966 | Kornreich | 333—31 |
| 3,268,353 | 8/1966 | Melillo | 117—47 |

WILLIAM L. JARVIS, *Primary Examiner.*